June 7, 1949.   A. U. WELCH, JR   2,472,323
ARC WELDING
Filed March 3, 1945
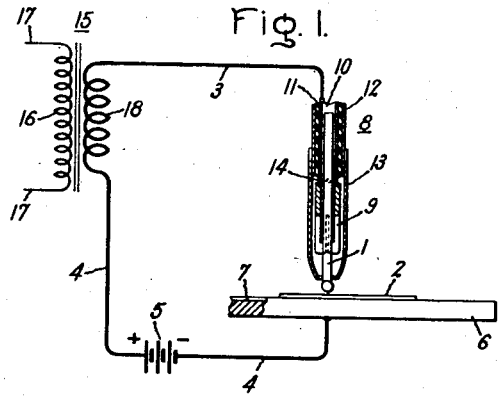
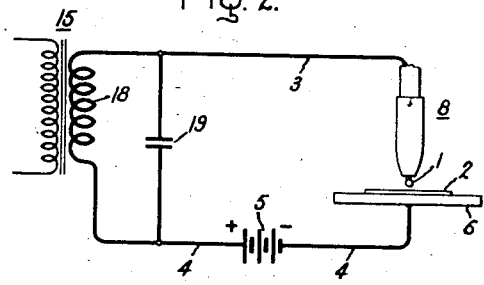
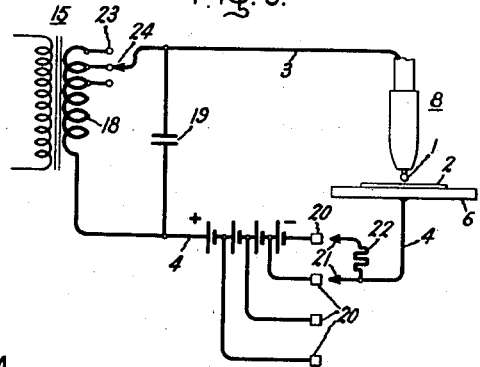
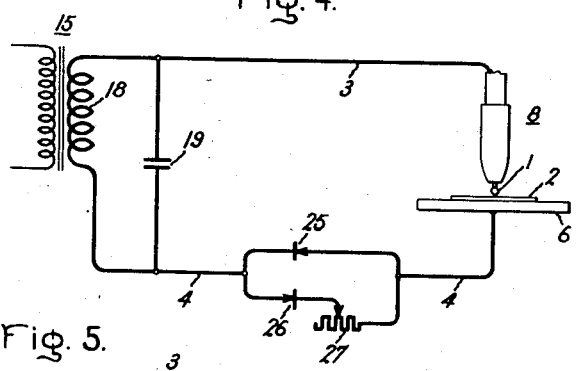
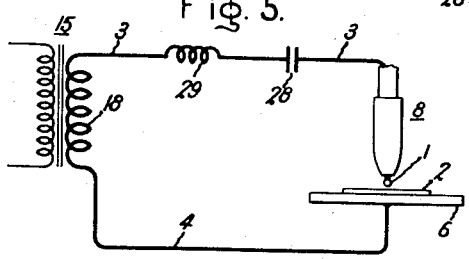
Inventor:
Alanson U. Welch, Jr.,
by Harry E. Dunham
His Attorney.

Patented June 7, 1949

2,472,323

UNITED STATES PATENT OFFICE 2,472,323

ARC WELDING

Alanson U. Welch, Jr., Pittsfield, Mass., assignor to General Electric Company, a corporation of New York Application March 3, 1945, Serial No. 580,855

23 Claims. (Cl. 315—166)

My invention relates to the fusion welding of metals by means of the alternating current arc. Although applicable to the fusion welding of all metals, it is particularly useful when applied to the fusion welding of aluminum and its alloys or metals and alloys like aluminum and its alloys.

In the past it has been the usual practice when fusion welding aluminum by means of the gas torch flame or the electric arc to employ solid fluxes to dissolve the inherently tough, refractory oxide film which is formed during the welding operation. The use of such flux incurs the expense involved in thoroughly cleaning all surfaces in contact with it in order to avoid damaging corrosion when moisture is present. If a flux inclusion occurs in or at the weld, the quality of the weld suffers, not so much from the inclusion itself but because of the corrosion which it induces.

It has been proposed to fusion weld aluminum with the electric arc established between a tungsten electrode and the aluminum in a shielding gas selected from the group consisting of argon and helium.

If the arc is fed from a direct current source of supply, it has been found necessary to connect the tungsten electrode to the positive terminal of this source for if the tungsten electrode is connected to the negative terminal thereof the oxide film previously referred to is not broken and although a large amount of heat is liberated in the aluminum, fusion of two parts to form a weld is not accomplished by the arc without the use of a flux. When welding with direct current and the electrode negative, the arc current passes through the oxide film without apparently rupturing it and the resulting weld bead has a wide zone of melting with a black narrow arc track down its center.

When, however, the tungsten electrode is connected to the positive terminal of a direct current source of supply, a bright mirrorlike molten pool of aluminum is formed under conditions satisfactory for the production of a desired weld. When the electrode is positive the oxide film on the aluminum is successfully dispersed in atmospheres of argon and helium without the use of a solid flux. However, when welding with the electrode positive the end of the tungsten electrode becomes very hot and forms a molten ball even though the melting point of tungsten is very high. Furthermore a very short arc less than 100 mils has to be maintained in order to concentrate the heat and stabilize the arc. With this short arc length, the molten ball on the end of the electrode is apt to sag and touch the aluminum, which not only contaminates the weld but causes the arc to become extremely wild thus making the welding operation difficult. If a long arc is used a gray dross will be formed on the surface of the weld pool. As a general rule in shielding gases of argon and helium the shorter the direct current arc with electrode positive the more stable it is and the better the weld formed thereby.

The difficulties encountered in the use of a direct current arc for welding aluminum in shielding gases of argon and helium may be eliminated by using an alternating current arc supplied from a source of commercial frequency, usually sixty cycles, provided the open circuit voltage of the source of supply is of sufficient magnitude. This has been pointed out in application Serial No. 522,686 Richard F. Wyer for Arc welding, filed February 17, 1944, and assigned to the same assignee as the present invention.

In the alternating current arc welding of aluminum in either argon or helium it was discovered that rectification of the current occurred at all times to a greater or lesser degree depending upon the welding conditions. The amount of rectification present and the direction of current flow seemed to determine whether or not the oxide film on the aluminum was dispersed. When little or no rectification occurred the oxide film appeared to be dispersed, but when complete rectification occurred the oxide film was not dispersed and welding without a solid flux could not be accomplished. In the argon atmosphere it was found necessary to use an alternating current source having open circuit voltages greater than 145 volts and preferably greater than 200 volts in order to establish desired welding conditions. In helium it was found necessary to use an alternating current source having open circuit voltages greater than 280 volts and preferably greater than 380 volts. With these necessary open circuit voltages, little rectification of the arc current occurred and a clean mirrorlike weld pool could be obtained which would result in the formation of a satisfactory weld. When open circuit voltages less than these values were used, complete rectification of the arc current occurred and the resulting bead had the same characteristically wide zone of melting with a dark narrow center arc track as when using a direct current source of supply with the electrode negative. It is hardly necessary to point out that these high open circuit voltages expose the welding operator to an undesired occupational hazard but also increase the cost of the welding apparatus required for the welding operation. Furthermore the direct current component of current flow through the arc and the source of alternating current supply will produce undesired heating of the apparatus used as a source of supply and at the same time reduce its rated output.

As pointed out in the above identified application of Richard F. Wyer, rectifier action of an alternating current arc in argon and in helium was also found to exist when welding other metals and is consequently not peculiar to aluminum and its alloys. It is my belief that this rectifier action occurs as a result of the difference in the electron emissivities of the electrodes at the temperatures produced by the operation of an alternating current arc. This difference in electron emissivities in the case of aluminum and its alloys may be in large measure determined by the formation on the surface of the work part during welding of the oxide film previously referred to. This oxide film or its equivalent may also be present on the work when welding metals other than aluminum and its alloys. Such a difference in electron emissivities of the electrodes of an alternating current arc would account for the production of a substantial direct current component of current flow through the arc. In the case of aluminum and its alloys this direct current component will flow from the aluminum and its alloys to the tungsten electrode.

It is an object of my invention to provide a method of and apparatus for improving the welding characteristics of an alternating current arc established between electrodes having substantially different electron emissivities as a result of the operating conditions established in using said arc.

It is a further object of my invention to provide a method of and apparatus for welding aluminum and its alloys with an alternating current arc established between a tungsten electrode and the aluminum and its alloys in a shielding gas of argon or helium when using open circuit voltages less than 145 volts.

It is a further object of my invention to provide a method of and apparatus for establishing an alternating current arc of desired welding characteristics between electrodes having substantially different electron emissivities as a result of the arcing conditions established in using the arc, by providing polarizing means in circuit therewith for preventing or opposing and reducing preferably to zero the tendency of the arc to generate a direct current component of current flow in the welding circuit.

It is also an object of my invention to supply through a high reactance transformer having a magnetic core structure subject to saturation upon the flow of direct current through its secondary winding, an alternating current arc established between electrodes having substantially different electron emissivities as a result of the arcing conditions established in using the arc, by employing polarizing means connected in the welding circuit in series with the arc for preventing or opposing and reducing preferably to zero the tendency of the arc to generate a direct current component of current flow in the welding circuit and the secondary winding of said high reactance transformer.

Further objects of my invention will become apparent from the following description thereof.

In accordance with my invention the welding characteristics of an alternating current arc and the operating characteristics of its said energizing circuit are improved by providing polarizing means in circuit with the arc for preventing or opposing and reducing preferably to zero the tendency of the arc to generate a direct current component of welding current flow therethrough. This polarizing means may comprise a direct current battery or other source of direct current connected in the welding circuit in the proper direction to oppose this direct current flow, or it may comprise means for reducing the conductivity of the energizing circuit of the arc during half cycles of that polarity of the alternating current source when the arc is more conductive. The reduction in conductivity of the welding circuit may be accomplished by using half wave rectifiers reversely connected in parallel with one another and in series with the arc and by including in circuit with one of the rectifiers means for reducing the half cycle of that polarity of alternating current flow through the welding arc and welding circuit which has a tendency to be greater than the half cycle of alternating current flow of opposite polarity. It is of course apparent that as a substitute for these reversely connected half wave rectifiers other polarizing means may be employed for selectively opposing half cycles of current flow of that polarity when the alternating current flow through the arc is of greater magnitude than during half cycles of alternating current flow of the opposite polarity.

It is also in accordance with my invention to eliminate the flow of direct current through the arc, its welding circuit, and the source of supply by connecting in series circuit therewith a capacitor which blocks the flow of this direct current. This capacitor is preferably matched to the reactance of the source and the welding circuit in order to produce at least partial resonance which will increase the operating stability of the welding arc. In like manner the stability of the arc may be increased when using a polarizing means as above suggested by connecting a capacitor across the welding circuit in order to produce surges of current across the arc gap shortly after the alternating current passes through zero. Preferably the capacitor has a value relative to the inductance and resistance of the welding circuit between it and the arc gap to produce surges of current of the order of full welding current at frequencies much greater than the frequency of the welding current source of supply.

When applying my invention to the arc welding of aluminum, and this includes alloys of aluminum and metals and alloys like aluminum and its alloys, the alternating current welding arc is established between the refractory metallic electrode, such as tungsten, and the aluminum in a shielding gas selected from the group consisting of argon and helium.

In the accompanying drawing I have illustrated apparatus in accordance with my invention. In Fig. 1 of this drawing the polarizing means employed is a direct current source of voltage obtained from a battery connected in the welding circuit. In Figs. 2 and 3 I have illustrated the capacitor connection for producing surges of current across the arc gap shortly after the alternating current passes through zero, and in Fig. 3 I have also illustrated a suitable switching means for adjusting the voltage introduced into the welding circuit by this source of direct current voltage. In Fig. 4 I have illustrated that modification of my invention in which the polarizing means comprises half wave rectifiers reversely connected in parallel with one another and in series with the arc, one of the rectifiers including in circuit therewith means for reducing the half cycle of that polarity of alternating current flow through the arc which has a tendency to be greater than the half cycle of alternating current flow of opposite polarity. In this figure I have also illustrated the capacitor connection employed in Figs. 2 and 3 for initiating current flow shortly after the alternating current passes through zero. In Fig. 5 I have illustrated the series capacitor connection for blocking the flow of direct current through the welding circuit. The inductance associated with this capacitor in order to create resonance or partial resonance in the welding circuit has also been illustrated in Fig. 5.

The apparatus illustrated in Fig. 1 is suitable for welding aluminum with an arc established between a tungsten electrode and the aluminum in a shielding gas, such as argon or helium. The tungsten electrode 1 and the aluminum work 2 are connected to the terminals of a welding circuit comprising conductors 3 and 4. This welding circuit 3, 4 is energized from a suitable source of alternating current and has connected in circuit therewith a source of direct current voltage 5 which is polarized to oppose and of such a value to reduce, preferably to zero, the direct current component of current flow in the welding circuit and in the arc established between electrode 1 and the work 2. Since the arc established between a tungsten electrode and an aluminum work part in a shielding gas of argon or helium generates a direct current component of current flow from the aluminum work part to the tungsten electrode, the source of direct current voltage 5 is polarized to oppose this current flow; that is, it is connected in the welding circuit with its positive terminal connected to or toward the electrode and its negative terminal connected to or toward the work.

Although as illustrated in the drawing the battery 5 is connected in the welding circuit lead 4, it is to be understood that it may also be connected in the welding circuit lead 3. In fact this latter connection will be employed where one terminal of the source is grounded and the work or its support is also grounded and connected by the welding circuit lead to the grounded terminal of the source of welding current for otherwise the battery would be short circuited through the grounded connections.

In the arrangement illustrated the work 2 is connected in the welding circuit through the agency of a support 6 upon which the aluminum parts 2 to be welded are supported with their adjoining edges centered and extending lengthwise of a groove 7 provided in the top surface thereof. It is of course not necessary to provide the work support with a groove but in order to secure desired weld penetration I find that it is preferable to have the adjoining edges of the work parts out of engagement with the support on which they are mounted.

As shown in Fig. 1 electrode 1 is connected in the welding circuit through the agency of a gas arc torch 8. Electrode 1 is held in this torch by the jaws of a spring collet 9 which is attached to the end of a copper tube 10 which in turn is connected to welding circuit conductor 3. Tube 10 also constitutes a means for supplying argon or helium about the electrode and molten portions of the work. It is surrounded by an electrically insulating sleeve 11 which is in turn covered by a protecting metallic sleeve 12. A nozzle 13 is supported by frictional engagement with the end of sleeve 12 and provides a chamber closing the end of tube 10 and enclosing collet 9 mounted thereon. Gas supplied through tube 10 flows into this chamber through a plurality of openings 14 in the end side walls of tube 10. This gas is discharged from the tip of nozzle 13 about the arcing terminal of electrode 1 and onto and about the portions of the work rendered molten by the arc.

The source of alternating current illustrated in Fig. 1 of the drawing is a high reactance transformer 15 having a magnetic core structure subject to saturation upon the flow of direct current through its secondary winding. The primary 16 of this welding transformer is connected through supply conductors 17 to a source of alternating current and its secondary winding 18 is connected in circuit with the welding circuit conductors 3, 4. This source of alternating current for the primary of the welding transformer may be obtained from the usually available distribution systems which supply sixty cycle current. Obviously other low frequency sources of supply may be used.

By reducing the direct current component of current flow in the welding circuit through the agency of battery 5 or a similar source of direct current voltage, it is possible to establish a suitable alternating current arc for welding aluminum with open circuit voltages of from 75 to 112 supplied by the secondary 18 of the welding transformer 15. The value of battery voltage necessary to reduce the direct current component of current flow to a low value, preferably zero, will in large measure vary in accordance with arcing conditions but will generally be of the order of from 2 to 10 volts. Thus for example if the electrode holder illustrated in Fig. 1 is provided with an electrode of much larger size than required by the flow of alternating current therethrough, or if this holder is suitably cooled so as to reduce the operating temperature of the electrode, the component of direct current flow in the arc will be reduced. This no doubt is the direct result of the lower operating temperature of the electrode and the consequent decrease in its electron emissivity at arcing temperature. In like measure much will depend upon the surface condition of the aluminum work part being welded. Arc stability will be increased if the surface of the aluminum to be welded is cleaned with sandpaper immediately preceding the welding operation.

By reducing the direct current component of current flow through the welding circuit and the secondary winding of the welding transformer, the output of the transformer is restored to its rated values. The direct current flow through the secondary winding of the transformer causes excessive primary current to be drawn from the power circuit to which its primary is connected. Thus by inserting enough direct current voltage in the welding circuit to hold the net direct current component of welding current close to zero the kilovoltampere demand from the power line can be decreased and the heating of the welding transformer primary winding can be greatly decreased. Thus for one type of transformer tested where there is a 10 per cent direct current component of total welding current, the welding transformer primary current becomes approximately 110 per cent of normal for total secondary current if alternating current. In like manner a 20 per cent direct current flow will produce approximately 120 per cent primary current and a 30 per cent direct current flow will produce approximately 130 per cent primary current flow.

Furthermore by reducing the direct current component in the welding circuit to a small value the operating characteristics of the welding arc are greatly improved and satisfactory welding may be performed at much lower open circuit alternating current voltages than would otherwise be required. Tests indicate that it is not necessary to reduce the direct current component to zero since reducing it to perhaps 5 or 10 per cent of normal welding current seems to be adequate. Reducing this direct current component increases the alternating current flow during the half cycle when the aluminum is emitting electrons and increases the length of this half cycle somewhat and therefore increases emission from the aluminum. This results in the arc cleaning up a much wider path on top of the weld.

It may be that saturation effects produced by the flow of direct current through the welding transformer secondary causes a reduction in the rate of voltage rise occurring whenever the welding current passes through zero and therefore is productive of a decrease in welding arc stability. Whatever the cause the alternating current arc stability is improved by eliminating or reducing to a low value the direct current flow in the welding circuit.

I have found that the stability of operation of the welding arc may be still further increased when using low open circuit voltages by connecting a small amount of capacitance across the welding circuit leads. I have used capacitors of from 1 to 16 microfarads connected as illustrated in Fig. 2 although of course higher values of capacitance will in certain circumstances be required. The capacitor 19 is connected across the welding circuit near the output terminals of the secondary winding 18 of the welding transformer. Its value relative to the inductance and resistance of the welding circuit 3, 4 between it and the arc gap between electrode 1 and the work 2 is such as to produce heavy surges of current across the arc gap shortly after the alternating current source of welding current passes through zero. These surges of current are oscillatory and occur at a high frequency compared to the frequency of the alternating current source of welding current supplied by transformer 15. It has been found less desirable to connect capacitor 19 across the welding circuit conductors at a point closely adjacent the arc gap. It is believed that such a connection is productive of extremely high frequencies which are damped by the greater effective resistance at higher frequencies of the discharge circuit in which they occur.

The operation of the capacitor shown in Fig. 2 is as follows: When the half cycle in which it is time for the aluminum to emit begins, the welding arc does not restrike immediately but the voltage increases to approximately the open circuit voltage of the secondary of the welding transformer. This voltage charges the small capacitor and there may be some overshooting in the charge of this capacitor as is usual when charging any capacitor through an inductive circuit. When the capacitor is charged it discharges into the welding arc, and since it is discharging through the welding lead circuit which has very low inductance the instantaneous discharge current is very high, of the order of full welding current or more. Cathode ray oscilloscope studies indicate that several such charges and discharges may take place during the first 10 to 20 per cent of the half cycle when the electrode is positive. This heavy discharge current seems to break down the oxide film on the aluminum, causing it to start emission whereupon normal low frequency welding current flows during the remainder of this half cycle. It has been found that the presence of this small amount of capacitance causes a considerable increase in stability of the welding arc at low open circuit voltages, that is, at voltages of the order of 75 volts.

Since, as has been previously pointed out, the amount of direct current voltage in the welding circuit required for producing the direct current component of current flow to a low value will vary with the alternating current through the arc, the surface condition of the work, the amount of heating of the electrode, as well as other variables, it is desirable to provide some means for varying the amount of voltage introduced in the welding circuit. In Fig. 3 I have illustrated a suitable switching means for accomplishing this result when the direct current source of voltage is a battery. As shown in Fig. 3, the terminals of the end cells of the battery are connected to contacts 20 forming part of a switching mechanism including cooperating contacts 21 which are connected in the welding circuit 4 through branch circuits with a resistance 22 connected in circuit with one of the contacts 21 in one of the branched circuits. The arrangement is such that switching from one contact 20 to another by means of the cooperating contacts 21 may be accomplished without open circuiting the welding circuit. During the transition period when moving from one contact 20 to another, the cell being switched in or out is short circuited through the current limiting resistance 22 and thereafter the circuit through contact 21 in circuit with resistance 22 is opened after the connection of the other contact 21 with the desired contact 20 has been made. In Fig. 3 the secondary 18 of the welding transformer 15 has also been provided with taps 23 and an adjustable connection 24 for changing the voltage of the secondary of the transformer connected to the welding circuit 3, 4.

The apparatus illustrated in Fig. 4 is functionally the equivalent of that shown in Fig. 2. In Fig. 4, instead of using the battery 5 to oppose and reduce preferably to zero the direct current component of current flow in the welding circuit, an unbalanced rectifier bridge connected in the welding circuit has been used for reducing the half cycle of that polarity of the alternating current flow through the arc which has a tendency to be greater than the half cycle of alternating current flow of opposite polarity. This rectifier bridge comprises half wave rectifiers 25 and 26 inversely connected in parallel with one another and an adjustable resistor 27 connected in circuit with one of them. The resistor 27 is connected in circuit with that rectifier which passes current during the half cycle of that polarity of the alternating current flow through the welding circuit when the conductivity of the arc is greater than the half cycle of alternating current flow of the opposite polarity which is passed by rectifier 25. Thus if the resistor 27 is properly adjusted the large half cycle of current flow through the welding circuit will be reduced to be approximately equal to the smaller half cycle and thereby the direct current component of current flow resulting from the rectifying characteristics of the arc will be eliminated from the welding circuit and the secondary winding of the welding transformer 15. The elimination of this direct current component of current flow will, as in the preceding figures, improve the welding characteristics of the arc established between the electrode 1 and the work 2.

In Fig. 5 I have illustrated a capacitor 28 connected in series in the welding circuit for eliminating the flow of direct current therethrough. I have also illustrated in circuit with capacitor 28 a reactor 29 which may be used when the reactance of the transformer 15 is insufficient to create a sufficiently resonant condition in the welding circuit.

By adjusting the capacitance relative to the inductive reactance of the circuit, various degrees of partial resonance may be obtained. Partial resonance is desirable in order to improve operating stability of the welding arc. This operating stability will be obtained whether the current in the welding circuit is leading or lagging, depending upon the value of capacitance employed. Lagging current will give somewhat better arc stability although there is not much difference between the stability obtained with leading current and with lagging current. The circuit operates so that when the welding arc is extinguished at normal current zero and does not immediately restrike, the voltage across the reactor collapses but the voltage across the capacitor is maintained for a short time until the capacitor discharges. Therefore the vector sum of the transformer open circuit voltage and the capacitor voltage is then available to restrike the arc. This voltage is, in the case of a lagging current circuit, available immediately and is of course higher than the normal open circuit voltage. In the case of the leading current circuit the restriking voltage is the same as the open circuit voltage at the time the arc goes out but increases in the next half cycle to the sum of transformer and capacitor voltage.

In each of the arrangements illustrated, provision has been made for preventing, eliminating or reducing to a low value, preferably zero, the flow of direct current through the welding circuit. As has been stated, this improves the operating characteristics of the apparatus as well as the welding characteristics of the arc, for the half cycles of alternating current flow are equalized or substantially equalized so that the time during which the work is emitting electrons is increased from that which would occur if the direct current flow were present in the circuit. Especially is this true when welding aluminum with an arc established between a tungsten electrode and the aluminum in a shielding gas of argon and helium. It may be that the direction of direct current flow produced in this arc, which is from the aluminum work part to the tungsten electrode, acts to create an anodic film on the aluminum in the same way that such films are formed in an electrolytic bath by the passage of current when the aluminum is of positive polarity, that is, the anode of the circuit through the electrolyte. As is known to be the case in anodizing in an electrolytic bath, the formation of such an oxide film on the aluminum acts to inhibit the flow of welding current from the aluminum. It may be that somewhat the same phenomenon occurs during arc welding under conditions such as obtained by establishing an arc between a tungsten electrode and the work with or without the presence of a suitable shielding atmosphere. By eliminating or decreasing to zero the direct current component of current flow through the arc, it may well be that the formation of this film is greatly retarded and that this accounts for the better welding conditions obtained. Apparently with the alternating current arc during the half cycles of that polarity when the work is positive, welding heat is applied to the work in necessary amounts by reason of the greater heating at the anode of the arc and that during half cycles of opposite polarity when the work is negative the oxide film formed on the work is reduced so that sufficient cleanup is provided for insuring proper welding conditions. Whatever the theory may be, it has been my experience that the arrangements provided are satisfactory for welding aluminum without the use of a solid flux such as has heretofore been considered necessary and without the use of a high open circuit voltage when the arc and molten portions of the metal are shielded by a gas such as argon or helium. Apparatus embodying my invention is thus possessed of many advantages as compared with apparatus heretofore employed for welding metals such as aluminum and its alloys. It is to be pointed out again, however, that my invention is not necessarily limited to the welding of aluminum and its alloys or similar metals and its alloys since the advantages inherent therein are of considerable importance in the welding of other metals and alloys.

Although but three types of polarizing means have been employed in the modifications of my invention illustrated in the drawing, it is of course apparent that other electrical means having the same functional effect may be substituted therefor without departing from the spirit and scope of my invention. Thus for example a direct current dynamo-electric machine of proper design to transmit the alternating welding current and to generate a direct current voltage for opposing the direct current component of current flow in the welding circuit may be substituted for the battery illustrated in Figs. 1 and 2. Such a dynamo-electric machine will be preferably of the variable voltage type and have associated therewith means for varying its output voltage, thereby becoming a substitute for the arrangement illustrated in Fig. 3 for varying the amount of direct current voltage introduced into the welding circuit. In like manner an electrically equivalent means may be substituted for the unbalanced rectifier bridge of Fig. 4. This means may comprise a circuit including controlled rectifiers and suitable control circuits associated therewith to control their conductivities by the application of suitable control voltages to the control elements of these rectifiers. Other arrangements will undoubtedly occur to those skilled in the art as substitutes for the arrangements illustrated and it is consequently my intention not to limit my invention by the appended claims to the polarizing means illustrated in the drawing and above described.

Although the capacitor 19 in Figs. 2, 3, and 4 has been illustrated as connected more closely adjacent the welding transformer than the arc gap for reasons given above, it is to be understood that this capacitor may be connected in the circuit in any manner productive of an increase of electron emissivity of one or both of the electrodes of the welding arc. I have discovered that the variation in value of the capacitor employed will have some effect on the flow of direct current in the welding circuit. Consequently it is desirable to vary the value of this capacitor in order to obtain an operating condition productive of reducing to a low value, preferably zero, the flow of direct current through the welding circuit.

It is of course apparent that my invention is not limited in its application to welding transformers having open circuit voltages less than 145 volts since operating advantages will also be obtained by reducing the direct current flow of welding current through the secondary winding of transformers for supplying secondary voltages greater than 145 volts. Transformers suitable for supplying these higher open circuit voltages will almost invariably have higher circuit resistance characteristics which will greatly reduce the magnitude of direct current flow therethrough. This current flow will, however, produce undesirable heating in the welding transformer.

Tests thus far made indicate that the direct current component of current flow is approximately equal to the direct current voltage in the range of from 2 to 10 volts divided by the direct current resistance of the welding circuit. Therefore if a 6 volt battery will eliminate the direct current component of current flow when welding at 300 volts open circuit and for example 75 amperes total alternating current, it will also eliminate the direct current component when welding at 115 volts open circuit and the same welding current. The only case in which this fails is when the open circuit voltage is so low that complete rectification occurs at the arc, in which case, of course, the battery or its equivalent polarizing means cannot possibly force current to go in the opposite direction.

The direct current component of current flow in the welding circuit will vary with the operating conditions of the arc. Thus for example with a 4 volt battery in the welding circuit the amount of direct current flow will be reduced to zero only at one particular value of alternating current flow, and for values above and below this value of alternating current flow there will be a direct current component flowing in one direction or the other through the welding circuit. Likewise with a 6 volt battery in the welding circuit the direct current component of current flow will be zero only at some higher value of alternating current flow but will again increase in one direction or the other as the alternating current flow increases or decreases above this value. Since a substantial direct current flow in either direction through the welding circuit will create undesirable operating conditions in the apparatus employed for supplying alternating current, it is desirable to obtain an adjustment of the circuit by a variation of the battery voltage or an adjustment of the equivalent polarizing means in accordance with alternating current flow in the welding circuit so that the direct current flow is not greater than 5 or 10 per cent of the normal welding current.

In view of the above description of my invention, modifications and applications thereof other than those considered above will occur to those skilled in the art to which it relates. I therefore aim to cover by the appended claims all such modifications and adaptations of my invention as fall within the true spirit and scope thereof.

What I claim as new and desire to secure by Letters Patent of the United States is:

1. The method of welding with an arc energized from a source of alternating current which comprises establishing said arc between electrodes having substantially different electron emissivities at the temperatures produced by the operation of said arc which consequently acts to produce a substantial direct current component of current flow through said arc and its energizing circuit, reducing preferably to zero the direct current component of current flow through said arc and its said energizing circuit by reducing the conductivity of the energizing circuit of said arc during half cycles of that polarity of said alternating current source when the arc is more conductive as a result of the difference in electron emissivity of said electrodes.

2. The method of arc welding aluminum and its alloys which comprises establishing between a tungsten electrode and said aluminum and its alloys a welding arc connected in circuit with and energized by a source of alternating current, supplying a shielding gas about said arc and the portions of said aluminum and its alloys rendered molten thereby, said gas being selected from the group consisting of argon and helium, and opposing the tendency of said arc to generate a direct current component of current flow therethrough by polarizing the circuit connecting said arc with said source so as to reduce preferably to zero the inequality of current flow therethrough to said arc during half cycles of opposite polarity of said source.

3. The method of arc welding aluminum and its alloys which comprises establishing between a tungsten electrode and said aluminum and its alloys a welding arc connected in circuit with and energized by a source of alternating current, supplying a shielding gas about said arc and the portions of said aluminum and its alloys rendered molten thereby, said gas being selected from the group consisting of argon and helium, and decreasing the conductivity of the energizing circuit of said arc to current flow during half cycles of said alternating current source when said electrode is of negative polarity and thereby reducing preferably to zero the direct current component of current flow through said arc from said aluminum and its alloys to said electrode.

4. The method of arc welding aluminum and its alloys which comprises establishing between a tungsten electrode and said aluminum and its alloys a welding arc connected in circuit with and energized by a source of alternating current, supplying a shielding gas about said arc and the portions of said aluminum and its alloys rendered molten thereby, said gas being selected from the group consisting of argon and helium, making the circuit between said source of alternating current and said arc more conductive to current flow in response to half cycles of one polarity of said source than to half cycles of the opposite polarity of said source and thereby reducing to a low value, preferably zero, the direct current component of current flow in said circuit and said arc which would otherwise result from the difference in conductivity of said arc during said half cycles of opposite polarity of said source.

5. Arc welding apparatus comprising arc welding electrodes having at arc temperatures substantially different electron emissivities so that an alternating current arc established between said electrodes has a tendency to generate a direct current component of current flow through said arc, means including a welding circuit for establishing an alternating current arc between said electrodes, and polarizing means connected in said welding circuit in series with said arc established between said electrodes for opposing the tendency of said arc to generate a direct current component of current flow in said welding circuit and for reducing preferably to zero the inequality of current flow through said welding circuit during half cycles of opposite polarity of alternating current flow to said welding arc.

6. Arc welding apparatus comprising an arc welding electrode having at arc temperatures a substantially different electron emissivity than the work to be welded so that an alternating current arc established between said electrode and the work has a tendency to generate a direct current component of current flow through said arc, means including a welding circuit for establishing an alternating current arc between said electrode and the work, means for supplying a shielding gas about the arcing terminal of said electrode and the portions of the work rendered molten thereby, and polarizing means connected in said welding circuit in series with said arc established between said electrode and the work for opposing the tendency of said arc to generate a direct current component of current flow in said welding circuit and for reducing preferably to zero the inequality of current flow through said welding circuit during half cycles of alternating current flow to said welding arc.

7. Arc welding apparatus comprising an arc welding electrode having at arc temperatures a substantially different electron emissivity than the work to be welded so that an alternating current arc established between said electrode and the work has a tendency to generate a direct current component of current flow through said arc, means including a welding circuit for establishing an alternating current arc between said electrode and the work, polarizing means connected in said welding circuit in series with said arc established between said electrode and the work for opposing the tendency of said arc to generate a direct current component of current flow in said welding circuit and for reducing preferably to zero the inequality of current flow through said welding circuit during half cycles of opposite polarity of alternating current flow to said welding arc, and means for initiating current flow from said electrode to the work shortly after the alternating current passes through zero, said means comprising a capacitor connected across said welding circuit and having a value relative to the inductance and resistance of said welding circuit between said capacitor and said arc gap between said electrode and the work to produce surges of current across said arc gap of the order of full welding current at frequencies much greater than the frequency of the welding current source of alternating current.

8. Arc welding apparatus comprising an arc welding electrode having at arc temperatures a substantially different electron emissivity than the work to be welded so that an alternating current arc established between said electrode and the work has a tendency to generate a direct current component of current flow through said arc, means including a welding circuit for establishing an alternating current arc between said electrode and the work, means for supplying a shielding gas about the arcing terminal of said electrode and the portions of the work rendered molten thereby, polarizing means connected in said welding circuit in series with said arc established between said electrode and the work for opposing the tendency of said arc to generate a direct current component of current flow in said welding circuit and for reducing preferably to zero the inequality of current flow through said welding circuit during half cycles of alternating current flow to said welding arc, and means for initiating current flow from said electrode to the work shortly after the alternating current passes through zero, said means comprising a capacitor connected across said welding circuit and having a value relative to the inductance and resistance of said welding circuit between said capacitor and said arc gap between said electrode and the work to produce surges of current across said arc gap of the order of full welding current at frequencies much greater than the frequency of the welding current source of alternating current.

9. Arc welding apparatus comprising an arc welding electrode having at arc temperatures a substantially different electron emissivity than the work to be welded so that an alternating current arc established between said electrode and the work has a tendency to generate a direct current component of current flow through said arc, means including a welding circuit for establishing an alternating current arc between said electrode and the work, and a source of direct current voltage connected in series with said arc in said welding circuit to supply current through said arc in opposition to the arc generated direct current component of current flow in said welding circuit, the voltage of said source of direct current voltage being of sufficient magnitude to reduce to a low value, preferably to zero, the flow of direct current in said welding circuit.

10. Arc welding apparatus comprising an arc welding electrode having at arc temperatures a substantially different electron emissivity than the work to be welded so that an alternating current arc established between said electrode and the work has a tendency to generate a direct current component of current flow through said arc, means including a welding circuit for establishing an alternating current arc between said electrode and the work, a source of direct current voltage connected in series with said arc in said welding circuit and polarized to oppose the tendency of said arc to produce a direct current component of current flow in said welding circuit, the voltage of said source of direct current voltage being of sufficient magnitude to reduce to a low value, preferably to zero, the flow of direct current in said welding circuit, and means for initiating current flow from said electrode to the work shortly after the alternating current passes through zero, said means comprising a capacitor connected across said welding circuit and having a value relative to the inductance and resistance of said welding circuit between said capacitor and said arc gap between said electrode and the work to produce surges of current across said arc gap of the order of full welding current at frequencies much greater than the frequency of the welding current source of alternating current.

11. Arc welding apparatus comprising an arc welding electrode having at arc temperatures a substantially different electron emissivity than the work to be welded so that an alternating current arc established between said electrode and the work has a tendency to generate a direct current component of current flow through said arc, means including a welding circuit for supplying alternating current to an arc established between said electrode and the work, a pair of half wave rectifiers reversely connected in parallel with one another and in series with said arc in said welding circuit, means connected in circuit with at least one of said rectifiers for reducing the half cycle of that polarity of said alternating current flow through said arc which has a tendency to be greater than the half cycle of alternating current flow of opposite polarity, and means for adjusting said last mentioned means to reduce preferably to zero the direct current component of current flow through said welding circuit as a result of the unequal periods of conduction of said arc during half cycles of opposite polarity of alternating current flow therethrough.

12. Arc welding apparatus comprising alternating current supply conductors connected to the primary winding of a high reactance transformer having a magnetic core structure subject to saturation upon the flow of direct current through its secondary winding, means for establishing an alternating current welding arc, said means including a welding circuit energized by said secondary winding of said transformer and having terminals connected to the work to be welded and to a refractory metallic electrode having an electron emissivity at arc temperatures substantially greater than the electron emissivity of said work so that an alternating current arc established between said electrode and the work has a tendency to generate a direct current component of current flow through said arc from the work to said electrode, and polarizing means connected in said welding circuit in series with said arc established between said electrode and the work for opposing the tendency of said arc to generate a direct current component of current flow in said welding circuit and the secondary winding of said welding transformer and for reducing preferably to zero the inequality of current flow through said welding circuit and said secondary winding of said welding transformer during half cycles of opposite polarity of alternating current flow supplied by said transformer to said welding arc.

13. Arc welding apparatus comprising alternating current supply conductors connected to the primary winding of a high reactance transformer having a magnetic core structure subject to saturation upon the flow of direct current through its secondary winding, means for establishing an alternating current welding arc, said means including a welding circuit energized by said secondary winding of said transformer and having terminals connected to the work to be welded and to a refractory metallic electrode having an electron emissivity at arc temperatures substantially greater than the electron emissivity of said work so that an alternating current arc established between said electrode and the work has a tendency to generate a direct current component of current flow through said arc from the work to said electrode, means for supplying a shielding gas about the arcing terminal of said electrode and the portions of the work rendered molten thereby, and polarizing means connected in said welding circuit in series with said arc established between said electrode and the work for opposing the tendency of said arc to generate a direct current component of current flow in said welding circuit and the secondary winding of said welding transformer and for reducing preferably to zero the inequality of current flow through said welding circuit and said secondary winding of said welding transformer during half cycles of opposite polarity of alternating current flow supplied by said transformer to said welding arc.

14. Arc welding apparatus comprising alternating current supply conductors connected to the primary winding of a high reactance transformer having a magnetic core structure subject to saturation upon the flow of direct current through its secondary winding, means for establishing an alternating current welding arc, said means including a welding circuit energized by said secondary winding of said transformer and having terminals connected to the work to be welded and to a refractory metallic electrode having an electron emissivity at arc temperatures substantially greater than the electron emissivity of said work so that an alternating current arc established between said electrode and the work has a tendency to generate a direct current component of current flow through said arc from the work to said electrode, polarizing means connected in said welding circuit in series with said arc established between said electrode and the work for opposing the tendency of said arc to generate a direct current component of current flow in said welding circuit and the secondary winding of said welding transformer and for reducing preferably to zero the inequality of current flow through said welding circuit and said secondary winding of said welding transformer during half cycles of opposite polarity of alternating current flow supplied by said transformer to said welding arc, and means for initiating current flow from said electrode to the work shortly after the alternating current passes through zero, said means comprising a capacitor connected across said welding circuit and having a value relative to the inductance and resistance of said welding circuit between said capacitor and said arc gap between said electrode and the work to produce surges of current across said arc gap of the order of full welding current at frequencies much greater than the frequency of the welding current source of alternating current.

15. Arc welding apparatus comprising alternating current supply conductors connected to the primary winding of a high reactance transformer having a magnetic core structure subject to saturation upon the flow of direct current through its secondary winding, means for establishing an alternating current welding arc, said means including a welding circuit energized by said secondary winding of said transformer and having terminals connected to the work to be welded and to a refractory metallic electrode having an electron emissivity at arc temperatures substantially greater than the electron emissivity of said work so that an alternating current arc established between said electrode and the work has a tendency to generate a direct current component of current flow through said arc from the work to said electrode, means for supplying a shielding gas about the arcing terminal of said electrode and the portions of the work rendered molten thereby, polarizing means connected in said welding circuit in series with said arc established between said electrode and the work for opposing the tendency of said arc to generate a direct current component of current flow in said welding circuit and said secondary winding of said welding transformer and for reducing preferably to zero the inequality of current flow through said welding circuit and said secondary winding of said welding transformer during half cycles of opposite polarity of alternating current flow supplied by said transformer to said welding arc, and means for initiating current flow from said electrode to the work shortly after the alternating current passes through zero, said means comprising a capacitor connected across said welding circuit and having a value relative to the inductance and resistance of said welding circuit between said capacitor and said arc gap between said electrode and the work to produce surges of current across said arc gap of the order of full welding current at frequencies much greater than the frequency of the welding current source of alternating current.

16. Arc welding apparatus comprising alternating current supply conductors connected to the primary winding of a high reactance transformer having a magnetic core structure subject to saturation upon the flow of direct current through its secondary winding, means for establishing an alternating current welding arc, said means including a welding circuit energized by said secondary winding of said transformer and having terminals connected to the work to be welded and to a refractory metallic electrode having an electron emissivity at arc temperatures substantially greater than the electron emissivity of said work so that an alternating current arc established between said electrode and the work has a tendency to generate a direct current component of current flow through said arc from the work to said electrode, and a source of direct current voltage connected in series with said arc in said welding circuit and polarized to oppose the tendency of said arc to produce a direct current component of current flow in said welding circuit, the voltage of said source of direct current voltage being of sufficient magnitude to reduce to a low value, preferably to zero, the flow of direct current in said welding circuit and the secondary winding of said transformer.

17. Arc welding apparatus comprising alternating current supply conductors connected to the primary winding of a high reactance transformer having a magnetic core structure subject to saturation upon the flow of direct current through its secondary winding, means for establishing an alternating current welding arm, said means including a welding circuit energized by the secondary winding of said transformer and having terminals connected to the work to be welded and to a refractory metallic electrode having an electron emissivity at arc temperatures substantially greater than the electron emissivity of said work so that an alternating current arc established between said electrode and the work has a tendency to generate a direct current component of current flow through said arc from the work to said electrode, a source of direct current voltage connected in series with said arc in said welding circuit and polarized to oppose the tendency of said arc to produce a direct current component of current flow in said welding circuit, and means for adjusting the voltage introduced in said welding circuit by said source of direct current voltage.

18. Arc welding apparatus comprising alternating current supply conductors connected to the primary winding of a high reactance transformer having a magnetic core structure subject to saturation upon the flow of direct current through its secondary winding, a welding circuit energized by said secondary winding of said transformer and having terminals connected to the work to be welded and to a refractory metallic electrode having an electron emissivity at arc temperatures substantially greater than the electron emissivity of said work so that an alternating current arc established between said electrode and the work has a tendency to generate a direct current component of current flow through said arc from the work to said electrode, a pair of half wave rectifiers reversely connected in parallel with one another and in series with said arc in said welding circuit, means connected in circuit with at least one of said rectifiers for reducing the half cycle of that polarity of said alternating current flow through said arc which has a tendency to be greater than the half cycle of alternating current flow of opposite polarity, and means for adjusting said last mentioned means to reduce preferably to zero the direct current component of current flow through said welding circuit and said secondary winding of said transformer as a result of the unequal periods of conduction of said arc during half cycles of opposite polarity of alternating current flow therethrough.

19. Apparatus for arc welding aluminum and its alloys comprising a tungsten electrode, means including a welding circuit energized by alternating current at open circuit voltages less than 145 volts for establishing an alternating current arc between said tungsten electrode and said aluminum and its alloys, means for supplying about the arcing terminal of said electrode and the portions of said aluminum and its alloys rendered molten thereby a shielding gas selected from the group consisting of argon and helium, and polarizing means in series connected in said welding circuit for opposing and reducing preferably to zero the direct current component of current flow which an alternating current arc established between said tungsten electrode and said aluminum and its alloys has a tendency to produce in said welding circuit.

20. Apparatus for arc welding aluminum and its alloys comprising a tungsten electrode, means including a welding circuit energized by alternating current at open circuit voltages less than 145 volts for establishing an alternating current arc between said tungsten electrode and said aluminum and its alloys, means for supplying about the arcing terminal of said electrode and the portions of said aluminum and its alloys rendered molten thereby a shielding gas selected from the group consisting of argon and helium, polarizing means series connected in said welding circuit for opposing and reducing preferably to zero the direct current component of current flow which an alternating current arc established between said tungsten electrode and said aluminum and its alloys has a tendency to produce in said welding circuit, and means for initiating current flow from said electrode to said aluminum and its alloys shortly after the alternating current passes through zero, said means comprising a capacitor connected across said welding circuit and having a value relative to the inductance and resistance of said welding circuit between said capacitor and said arc gap between said electrode and said aluminum and its alloys to produce surges of current across said arc gap of the order of full welding current at frequencies much greater than the frequency of the welding current source of alternating current.

21. Apparatus for arc welding aluminum and its alloys comprising alternating current supply conductors connected to the primary winding of a high reactance transformer having a magnetic core structure subject to saturation upon the flow of direct current through its secondary winding, a tungsten electrode, means including a welding circuit connected to said secondary winding of said welding transformer for establishing an alternating current arc between said tungsten electrode and said aluminum and its alloys, means for supplying about the arcing terminal of said electrode and the portions of said aluminum and its alloys rendered molten thereby a shielding gas selected from the group consisting of argon and helium, and polarizing means series connected in said welding circuit for reducing preferably to zero the flow of direct current therethrough.

22. Apparatus for arc welding aluminum and its alloys comprising alternating current supply conductors connected to the primary winding of a high reactance transformer having a magnetic core structure subject to saturation upon the flow of direct current through its secondary winding, a tungsten electrode, means including a welding circuit connected to said secondary winding of said welding transformer for establishing an alternating current arc between said tungsten electrode and said aluminum and its alloys, means for supplying about the arcing terminal of said electrode and the portions of said aluminum and its alloys rendered molten thereby a shielding gas selected from the group consisting of argon and helium, and electrical means connected in said welding circuit for prohibiting the flow of direct current therethrough.

23. Apparatus for arc welding aluminum and its alloys comprising alternating current supply conductors connected to the primary winding of a high reactance transformer having a magnetic core structure subject to saturation upon the flow of direct current through its secondary winding, a tungsten electrode, means including a welding circuit connected to said secondary winding of said welding transformer for establishing an alternating current arc between said tungsten electrode and said aluminum and its alloys, means for supplying about the arcing terminal of said electrode and the portions of said aluminum and its alloys rendered molten thereby a shielding gas selected from the group consisting of argon and helium, polarizing means series connected in said welding circuit for reducing preferably to zero the flow of direct current therethrough, and means for initiating current flow from said electrode to said aluminum and its alloys shortly after the alternating current passes through zero, said means comprising a capacitor connected across said welding circuit and having a value relative to the inductance and resistance of said welding circuit between said capacitor and said arc gap between said electrode and said aluminum and its alloys to produce surges of current across said arc gap of the order of full welding current at frequencies much greater than the frequency of the welding current source of alternating current.

ALANSON U. WELCH, JR.

REFERENCES CITED

The following references are of record in the file of this patent:

UNITED STATES PATENTS

| Number | Name | Date |
| --- | --- | --- |
| 1,979,944 | Kost | Nov. 6, 1934 |
| 2,097,327 | Hunter | Oct. 26, 1937 |
| 2,139,160 | Hebeler | Dec. 6, 1938 |
| 2,294,498 | Heindlhofer | Sept. 1, 1942 |
| 2,314,628 | Pavlecka | Mar. 23, 1943 |
| 2,431,080 | Ritter et al. | Nov. 18, 1947 |

OTHER REFERENCES

Wassell, "Characteristics of Welding Arcs on Aluminum in Atmospheres of Helium and Argon," The Welding Journal, Oct. 1944, pp. 487-S through 493-S. Copy in Sci. Library.

---

Certificate of Correction

Patent No. 2,472,323    June 7, 1949

ALANSON U. WELCH, JR.

It is hereby certified that errors appear in the printed specification of the above numbered patent requiring correction as follows:

Column 12, line 36, for the words "or argon" read *of argon*; column 19, line 21, for "electrical" read *polarizing*; same line, after "means" insert *series*;

and that the said Letters Patent should be read with these corrections therein that the same may conform to the record of the case in the Patent Office.

Signed and sealed this 20th day of December, A. D. 1949.

[SEAL]

THOMAS F. MURPHY,
*Assistant Commissioner of Patents.*